United States Patent Office 3,065,974
Patented Nov. 27, 1962

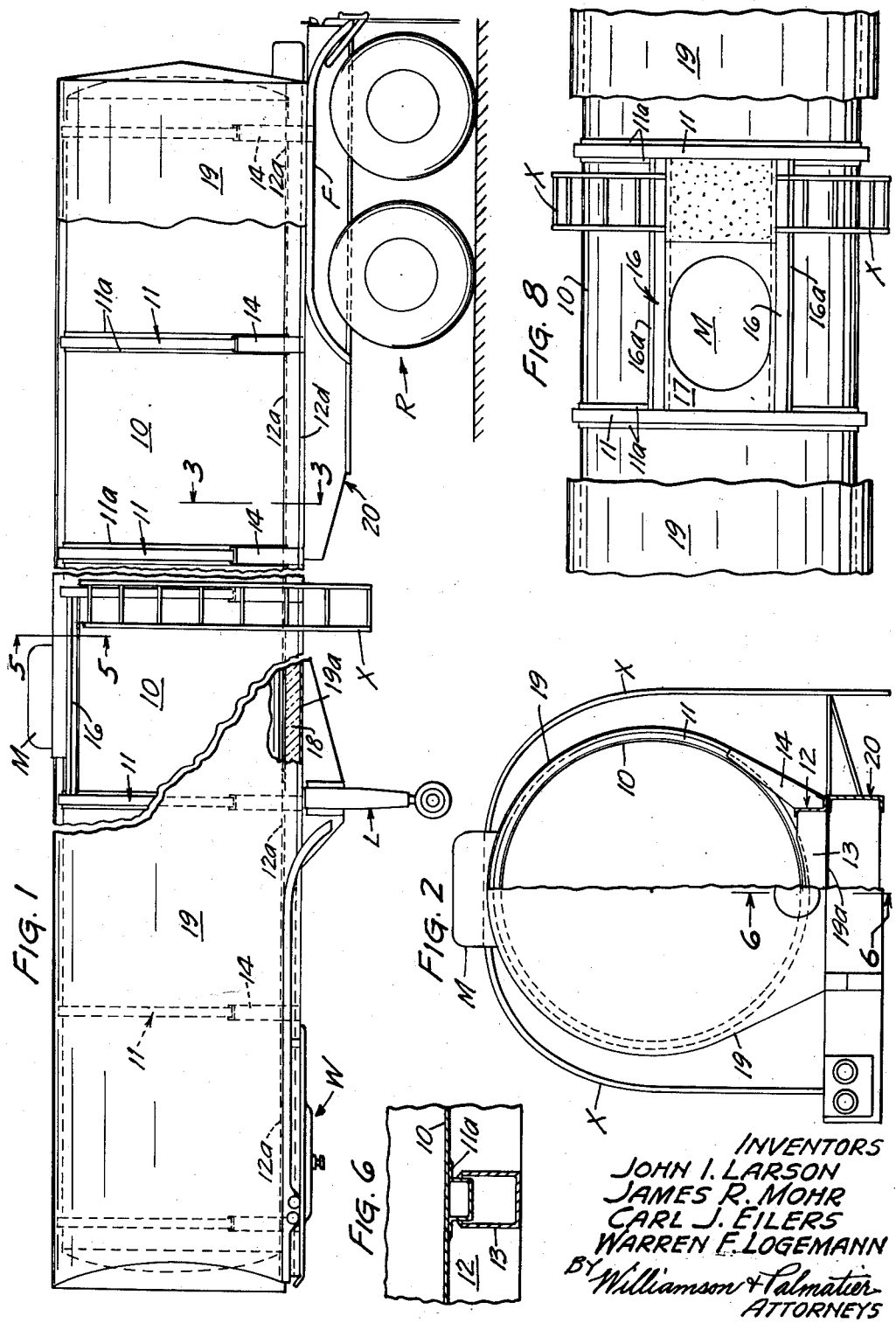

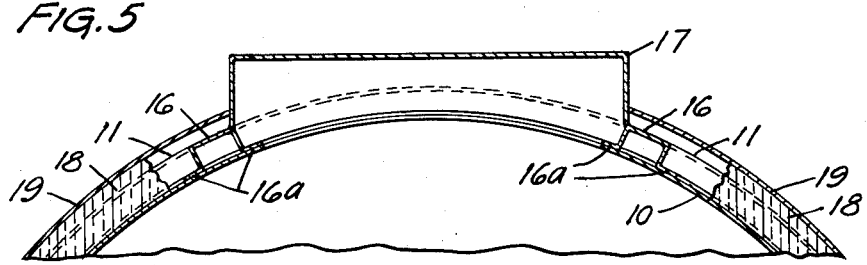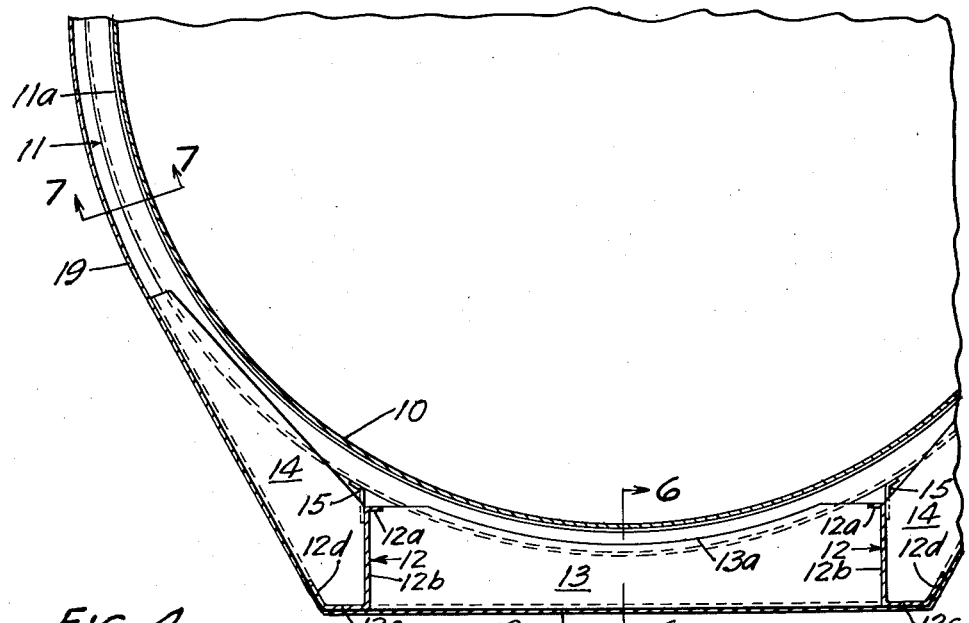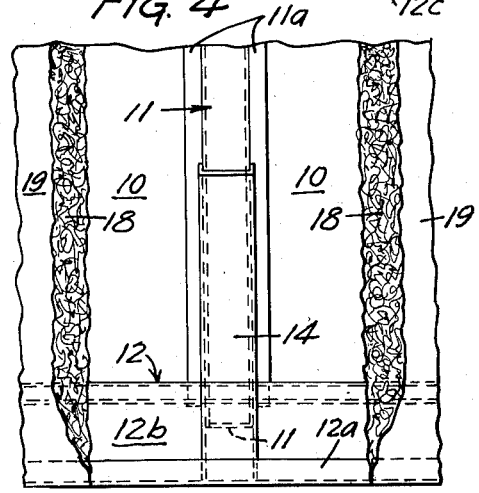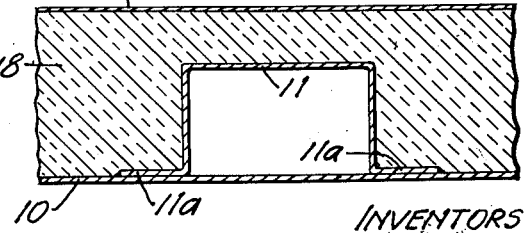

3,065,974
TRANSPORT TANK CONSTRUCTION
John I. Larson and James R. Mohr, Minneapolis, and Carl J. Eilers and Warren F. Logemann, St. Paul, Minn., assignors to Stainless & Steel Products Co., St. Paul, Minn., a corporation of Minnesota
Filed Sept. 11, 1961, Ser. No. 137,350
2 Claims. (Cl. 280—5)

This invention relates to transport trailer tanks, both jacketed and unjacketed, such as are utilized in the transportation of liquids and granular solids, and particularly to novel frame design and construction for supporting the tank and connecting it to the running gear.

In tank transports, the tare weight thereof is of prime and critical importance, because of the limitations placed thereon by law, and each pound saved in total tare weight means a pound more of payload which may be hauled. Thus, it is important that the manufacturers of trailer tanks make the total capacity as large as possible within the weight limitations imposed consistent with adequate strength in order that the carrier may achieve a maximum payload on each trip.

It is also important in trailer tank construction that the tank and the supporting structure therefor be properly stressed to resist the shock and strain encountered during use to prolong the life thereof and reduce repair and replacement caused by failure of the original equipment to a minimum.

The primary object of this invention is to provide a transport trailer tank having a more unitary design and which is more properly stressed and provides for more uniform stress distribution than tank transports presently and previously available.

Another important object is to provide a novel trailer tank construction which materially increases the ratio of capacity or payload to the tare weight of the unit through use of the aforementioned novel unitary, properly stressed design of this invention.

Another object is to provide a novel trailer tank which requires less labor and material per unit of payload in the construction thereof.

Another object is to provide a novel tank transport design in which the material receiving tank is directly united with the trailer portion of the assembly in a more uniformly and properly stressed manner and with a lower weight-to-capacity ratio than heretofore.

Still another object is to provided a jacketed transport trailer tank of novel design in which both the material receiving tank and its jacket are individually fastened directly to and united with the main supporting structure comprising the trailer portion of the assembly to provide a more unified and better stressed assembly capable of greater capacity for any given gross weight than has heretofore been possible.

These and other objects and advantages of our invention are more fully understood from the following description made in connection with the accompanying drawings, wherein like reference characters refer to the same or similar parts throughout the several views, and in which:

FIG. 1 is a side elevational view of a trailer tank of our invention, with portions thereof broken away; and FIG. 2 is a rear elevational view as seen from the right of FIG. 1 with half of the tank broken away to reveal the interior construction thereof;

FIG. 3 is a partial cross sectional view on an enlarged scale of the lower supporting structure taken on the line 3—3 of FIG. 1;

FIG. 4 is a side elevational view of the portion of the assembly shown in FIG. 3 as viewed from the left side of FIG. 3, with a portion of the jacket broken away;

FIG. 5 is a partial cross sectional view on an enlarged scale of the upper supporting structure taken along the line 5—5 of FIG. 1;

FIG. 6 is a vertical section on an enlarged scale taken on the line 6—6 of FIG. 3 showing the bolster in cross section;

FIG. 7 is a cross sectional view of the channel rings taken along the line 7—7 of FIG. 3; and FIG. 8 is a partial top plan view on an enlarged scale of the center portion of the assembly of FIG. 1, with a portion of the jacket broken away.

For convenience, this disclosure is particularly directed to the construction of jacketed insulated double walled trailer tanks such as those employed in hauling bulk milk, although it is understood that the scope of the invention is not limited thereto since the same basic novel inventive design disclosed herein may also be applied to unjacketed trailer tanks to achieve the unity of design and uniformity of stress distribution desired. In one common prior art method of constructing trailer tanks of this type, the elements comprising the tank unit, including the inner shell or material receiving tank, the outer shell or jacket, and the insulation therebetween have first been assembled as a unit and then installed and mounted as a unit on a cradle mounted on the bed of a conventional trailer unit, with the tank unit being secured to the trailer unit by clamping the outer shell or jacket to the cradle. Thus, in this type of prior art construction, the inner shell or tank is "floatingly" confined within, and held on the trailer by, the outer jacket, with the tank and trailer being basically separate units clamped together, with no direct connection and supporting relationship between the inner shell and the trailer unit.

Reference is now made to the accompanying drawings for a more detailed description of the unitary and better stressed design of our invention. The jacketed insulated trailer tank assembly shown in the accompanying drawings includes an inner material receiving tank or shell 10 which may be of any cross sectional shaped desired including cylindrical, elliptical and oval and is preferably of thin walled construction and may consist of one or more compartments. When the tank 10 is to be used to transport sanitary materials such as milk, it is preferably formed of stainless steel.

The tank 10 is encircled at axially spaced intervals by reinforcing hat section channel ring members 11 for circumferentially reinforcing the tank. The flanges 11a of the rings are welded to the outer wall of the tank around the entire circumference thereof to securely fasten the rings to the tank. The location and number of these rings will vary according to the weight of the product to be carried, the location of the king pin and spring suspension, and the landing legs. Two elongate laterally spaced apart longitudinally extending tank supporting or side frame members 12 of angular cross section are provided which extend the full length of the tank 10 and underlie and support the same by interconnecting the ring members. The supporting members 12 are preferably located as shown approximately midway between the center and outside of the tank with the axis of the supporting members disposed beneath and spaced from the bottom of the tank to provide balanced support for the tank with a minimum of strain on the supporting members. These supporting members 12 are integrally united with each other, braced, and fastened to the tank by means of transverse cross members or bolsters 13 which extend therebetween, said bolsters preferably being of channel shaped cross section, the ends of which abut with and are welded to the inner faces of the vertical leg 12b of the members 12, with the upper inwardly extending flange 12a of the supporting members overlapping said bolsters. A bolster 13 is provided for each of the reinforcing rings 11, each bolster being in alignment with and underlying, receiving and supportingly engaging its respective ring 11 and being welded thereto along its upper edges to integrally fasten them together. The upper edge portion of the side walls of the bolsters are provided with curved cut-outs 13a corresponding to the curvature of the tank and rings to enable the rings to be properly seated in the bolsters.

Elongated upwardly tapered side channels or outrigger members 14 of channel shaped cross section are provided on each side of each of the reinforcing rings 11. The lower ends of the outriggers 14 are seated in the pocket defined by the vertical leg 12b and the horizontal leg 12c and the upwardly and outwardly extending flange 12d of the supporting members 12 and welded to said members. The outriggers extend diagonally outwardly and upwardly from the supporting members 12 so as to underlie and receive a portion of their respective rings and are welded to the rings to integrally fasten the outriggers to the rings to distribute the stress from the running gear into the rings. These outriggers 14 serve as additional means for fastening the supporting members 12 to the tank. They also function to restrict deformation of the rings 11 under load and reinforce the tank against rolling or lateral movement. Thus, the longitudinal members 12 are fastened to the tank through the bolsters and outriggers which are fastened to the tank rings and the longitudinal members.

Vertically disposed bent channel clips 15 are also provided which extend between and are welded to the outer face of the channel rings 11 and the side frame members 12 to provide additional support. Thus, the tank 10 and its main supporting structure including the rings 11, the side frames 12, the bolsters 13, the outriggers 14 and the clips 15 are all interconnected and fastened together by welding to form a unified all welded construction which achieves proper uniform stress distribution and which provides adequate support for the tank with less weight than heretofore required by eliminating the heavy conventional trailer body, cradle and clamp structure.

Elongate compression members 16 are provided on the upper half of the tank which extend longitudinally of the tank on each side of the longitudinal axis thereof and which span the longitudinal center to reinforce same. These members are hat section channels similar to the rings 11, the flanges 16a of which are welded to the tank with the ends thereof being welded to the channel rings 11 with which they abut. The top of the tank is also provided with a manhole deck 17 disposed between the compression members, on which is mounted a manhole cover M providing access to the interior of the tank.

The foregoing description applies to both jacketed and unjacketed trailer tanks. If the trailer tank is of the jacketed insulated type, as shown in the accompanying drawings, the tank is completely enclosed with suitable insulation 18 after the tank has been fastened to and united with the supporting structure as hereinbefore described. The sides and top of the tank are enclosed by a jacket 19, the lower ends of which are fastened to the outer upturned flanges 12d of the supporting members 12 to anchor the jacket to the supporting structure. The underside of the tank is enclosed by an additional jacket member 19a to complete the enclosure of the tank and insulation, which member is also anchored to the supporting members 12.

The supporting members 12 function as tension members to strengthen the tank 10, serve as a means of fastening and holding the outer jacket in place, and also serve as a means of fastening the appurtenances to the tank. Thus, the running gear indicated in the entirety by the letter R is mounted on and suspended from the frame members 12 by means of the bogie frame 20 which is secured directly to the underside of the frame members 12 in any suitable fashion as by welding. The entire running gear construction including the bogie, frame, suspension, axles, wheels, etc., may be of any suitable conventional construction well known to those skilled in the art and therefore a detailed description thereof is considered unnecessary to a full understanding of the invention. Other conventional appurtenances such as the landing legs L, the fifth wheel assembly W, miscellaneous cabinets (not shown), the fenders F and the ladders X are also fastened to and supported by the main supporting structure hereinbefore described. These appurtenances may also be of any suitable conventional design and construction and therefore a detailed description thereof is unnecessary.

From the foregoing, it is apparent that we have devised a novel trailer tank construction which provides a unified uniformly stressed construction whereby the tank is integrally fastened to or connected with the running gear through the rings 11, supporting members 12, bolsters 13, and outriggers 14 and which provides adequate strength and proper stress distribution and at the same time materially reduces the amount of supporting structure needed as compared with prior art construction, thereby permitting a considerably larger payload or capacity per unit of tare weight.

Thus, for example, a trailer tank assembly weighing 10,800 pounds made by the prior conventional method of a floating construction installed on a cradle and trailer unit as hereinbefore described had a capacity of approximately 5,400 gallons. However, by utilizing the novel method of construction of this invention set forth hereinbefore, an assembly having the same tare weight as before can now be made with a capacity of 5,700 gallons instead of the previous 5,400, thereby resulting in an increase of 300 gallons in capacity while maintaining the same tare weight of the assembly. This represents an increase of 5½% in the total payload without any increase in labor expenditure and with lower material requirements, resulting in an overall saving in the cost of manufacture. In addition, the new construction results in a unified and much more properly stressed construction than previously available where the trailer and the tank were basically separate units clamped together.

It will, of course, be understood that various changes may be made in the form, details, arrangement and proportions of the various parts without departing from the scope of our invention.

What we claim is:

1. In a trailer tank construction, a tank, a plurality of tank reinforcing rings of channel shaped cross section encircling said tank at spaced intervals along the length thereof and secured thereto about the circumference thereof, a supporting frame underlying said tank comprised of a pair of elongate laterally spaced apart side members extending substantially the entire length of said tank and disposed inwardly from the sides thereof and in substantial alignment with the bottom thereof, and transverse cross-members of channel cross section extending between said side members and fastened thereto, said cross-members underlying said rings and being fastened thereto also, said side members when viewed in cross section having a vertically disposed leg, a horizontal outwardly extending leg, and an inclined flange extending upwardly and outwardly from said horizontal leg to define a trough in conjunction with said legs, elongate outrigger members of channel cross section extending upwardly and outwardly between said side members and said rings and secured to both to transfer stress from said members to said rings, said outriggers having their lower end portions seated in said trough, elongate compression members of channel cross section extending longitudinally of said tank between and abutting with a pair of adjacent rings disposed on opposite sides of the longitudinal center of said tank, said compression members being secured to the rings with which they abut and to the upper half of said tank, said compression members also being disposed on opposite sides of the longitudinal centerline of said tank, and a bogie frame rigidly secured to said side members for mounting running gear thereon.

2. The trailer tank construction of claim 1, including a jacket spaced from and enclosing said tank and fastened to said inclined flange to anchor it in place, and insulation disposed in the space between said tank and jacket.

References Cited in the file of this patent

UNITED STATES PATENTS

| | | |
|---|---|---|
| 1,886,197 | Kramer | Nov. 1, 1932 |
| 1,908,684 | Buchanan | May 16, 1933 |
| 2,078,939 | Ferguson | May 4, 1937 |
| 2,567,164 | Brehany et al. | Sept. 11, 1951 |
| 2,826,421 | Mueller | Mar. 11, 1958 |